United States Patent
Claussen et al.

(10) Patent No.: US 6,604,414 B1
(45) Date of Patent: Aug. 12, 2003

(54) SUPPLY AND TIRE PRESSURE SENSING APPARATUS AND METHOD

(75) Inventors: Stephen P. Claussen, Richland, MI (US); James A. Beverly, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 84 days.

(21) Appl. No.: 10/004,762

(22) Filed: Dec. 4, 2001

(51) Int. Cl.$^7$ .............................................. E01C 23/00
(52) U.S. Cl. ................................................. 73/146
(58) Field of Search .............................. 73/146, 146.2, 73/146.3, 146.8; 340/442–448; 152/415, 419

(56) References Cited

U.S. PATENT DOCUMENTS

| | | | |
|---|---|---|---|
| 2,695,122 A | 11/1954 | Learman | 220/20.6 |
| 4,441,539 A | 4/1984 | Hulse | 152/417 |
| 4,506,708 A | 3/1985 | Onuma | 141/4 |
| 4,619,303 A | 10/1986 | Bryan et al. | 152/416 |
| 4,640,331 A | 2/1987 | Braun et al. | 152/416 |
| 4,678,017 A | 7/1987 | Schultz | 152/416 |
| 4,708,184 A | 11/1987 | Pechar | 152/417 |
| 4,724,879 A | 2/1988 | Schultz et al. | 152/416 |
| 4,744,399 A | 5/1988 | Magnuson et al. | 152/417 |
| 4,754,792 A | 7/1988 | Braun et al. | 152/417 |
| 4,763,709 A | 8/1988 | Scholer | 152/416 |
| 4,782,878 A | 11/1988 | Mittal | 152/417 |
| 4,782,879 A | 11/1988 | Le Chatelier et al. | 152/417 |
| 4,825,925 A | 5/1989 | Schultz | 152/415 |
| 4,860,579 A | 8/1989 | Beverly | 73/146.2 |
| 4,875,509 A | 10/1989 | Da Silva | 141/38 |
| 4,883,105 A | 11/1989 | Schultz | 152/416 |
| 4,883,106 A | 11/1989 | Schultz et al. | 152/417 |
| 4,893,664 A | 1/1990 | Oltean | 152/416 |
| 4,898,216 A | 2/1990 | Schultz et al. | 141/4 |
| 4,905,742 A | 3/1990 | Mohs | 141/38 |
| 4,917,163 A | 4/1990 | Schultz | 152/415 |
| 4,922,946 A | 5/1990 | Boulicault | 137/102 |
| 4,924,926 A | 5/1990 | Schultz et al. | 152/417 |
| 5,071,259 A * | 12/1991 | Metzger et al. | 73/146.5 X |
| 5,121,774 A | 6/1992 | Hicks et al. | 141/4 |
| 5,174,839 A | 12/1992 | Schultz et al. | 152/415 |
| 5,179,981 A | 1/1993 | Hicks et al. | 141/4 |

(List continued on next page.)

OTHER PUBLICATIONS

"Tire Maintenance System Installation and Troubleshooting", Dana Corporation, Jul. 2001.

*Primary Examiner*—Hezron Williams
*Assistant Examiner*—C Dickens
(74) *Attorney, Agent, or Firm*—Dykema Gossett PLLC

(57) ABSTRACT

An apparatus for and a method of sensing fluid pressure of a tire and the fluid supply of a tire pressure management system maintaining same, with a central sensor and which requires the control of only two valves. The apparatus for sensing fluid pressure of a tire and the fluid supply of a tire pressure management system maintaining same, includes a sensor disposed so as to be selectably in fluid communication with one or both of: a first valve, operable from an open position through a closed position, for respectively promoting and prohibiting fluid flow from the fluid supply, and a second valve, operable from an open position through a closed position, for respectively promoting and prohibiting fluid flow to or from the tire. The method of sensing fluid pressure of a tire and the fluid supply of a tire pressure management system maintaining same includes disposing a sensor so as to be selectably in fluid communication with one or both of: a first valve, operable from an open position through a closed position, for respectively promoting and prohibiting fluid flow through a supply passage from the fluid supply, and a second valve, operable from an open position through a closed position, for respectively promoting and prohibiting fluid flow to or from the tire.

14 Claims, 3 Drawing Sheets

U.S. PATENT DOCUMENTS

| | | | | |
|---|---|---|---|---|
| 5,180,456 A | | 1/1993 | Schultz et al. | 152/416 |
| 5,253,687 A | | 10/1993 | Beverly et al. | 152/416 |
| 5,273,064 A | | 12/1993 | Beverly et al. | 137/102 |
| 5,291,776 A | | 3/1994 | Mallison | 73/146 |
| 5,309,969 A | | 5/1994 | Mittal | 152/415 |
| 5,313,995 A | | 5/1994 | Schultz | 152/416 |
| 5,505,080 A | * | 4/1996 | McGhee | 73/146.5 |
| 5,516,379 A | | 5/1996 | Schultz | 152/415 |
| 5,540,268 A | | 7/1996 | Mittal | 152/415 |
| 5,553,647 A | | 9/1996 | Jaksic | 152/415 |
| 5,587,698 A | * | 12/1996 | Genna | 73/146.5 X |
| 5,600,301 A | | 2/1997 | Robinson, III | 340/442 |
| 5,611,875 A | | 3/1997 | Bachhuber | 152/415 |
| 5,629,873 A | | 5/1997 | Mittal et al. | 364/558 |
| 5,629,874 A | | 5/1997 | Mittal | 364/558 |
| 5,674,332 A | | 10/1997 | Battocchio | 152/416 |
| 5,838,229 A | | 11/1998 | Robinson, III | 340/442 |
| 6,067,850 A | | 5/2000 | Lang et al. | 73/146.8 |
| 6,098,682 A | | 8/2000 | Kis | 152/415 |
| 6,144,295 A | * | 11/2000 | Adams et al. | 73/146.5 X |
| 6,246,317 B1 | | 6/2001 | Pickornik et al. | 340/447 |
| 6,250,327 B1 | | 6/2001 | Freigang et al. | 137/225 |
| 6,283,186 B1 | | 9/2001 | Krisher | 152/417 |
| 6,293,147 B1 | | 9/2001 | Parker et al. | 73/462 |

* cited by examiner

SUPPLY AND TIRE PRESSURE SENSING APPARATUS AND METHOD

BACKGROUND OF THE INVENTION

Conventional tire pressure management systems typically have central tire inflation systems (CTI systems), also known as on-board inflation systems and traction systems. These tire pressure management systems are well known, as may be seen by reference to the following U.S. Patent Nos.: U.S. Pat. Nos. 5,516,379; 5,313,995; 5,273,064; 5,253,687; 5,180,456; 5,179,981; 5,174,839; 5,121,774; 4,924,926; 4,922,946; 4,917,163; 4,893,664; 4,883,106; 4,883,105; 4,825,925; 4,782,879; 4,754,792; 4,724,879; 4,678,017; 4,640,331; and 4,619,303. The entire disclosures of each of these patents is incorporated herein.

Generally, tire pressure management systems employ a pneumatically controlled wheel valve that is affixed to each vehicle wheel assembly for controlling tire pressure in response to pressure signals from a fluid control circuit. The fluid control circuit is connected to each wheel valve via a rotary seal assembly associated with each wheel valve. Tire pressure may be monitored by a sensor positioned in a conduit assembly in the fluid control circuit. When the wheel valve and certain control valves are opened, the pressure in the conduit assembly equalizes to tire pressure which can be sensed by the sensor. An electronic control unit receives electrical pressure signals generated by the sensor and appropriately controls the fluid control circuit in response thereto for inflating or deflating a selected tire.

Most tire pressure management systems rely on multiple solenoids for promoting and prohibiting flow with respect to a fluid source or sink, and for promoting and prohibiting flow with respect to tires and/or tire sets. Many of these tire pressure management systems also rely on multiple pressure sensors for ascertaining fluid pressures associated with fluid sources, tires and the various conduit assemblies therebetween. For example, one sensor may be dedicated to sensing the pressure of fluid in the fluid source, while another sensor may be dedicated to sensing the pressure of fluid in a tire.

The use of multiple sensors is costly and may respond to pressure differently, thus potentially causing a tire pressure management system to undertake certain operations based on pressure measurements that to not comport with other pressure measurements. To enjoy the advantages provided through implementation of a centralized sensor configuration, tire pressure management systems typically require the use of multiple valves or solenoids to effect fluid communication between the sensor and the element, such as the fluid source or a tire, for which pressure measurement is needed. Coordination of multiple valves is cumbersome, enervating and potentially problematic. What is needed is an apparatus for and a method of sensing fluid pressure of a tire and the fluid supply of a tire pressure management system maintaining same, with a central sensor and which requires the control of only two valves.

SUMMARY OF THE INVENTION

The invention provides an apparatus for and a method of sensing fluid pressure of a tire and the fluid supply of a tire pressure management system maintaining same, with a central sensor and which requires the control of only two valves. The apparatus for sensing fluid pressure of a tire and the fluid supply of a tire pressure management system maintaining same, includes a sensor disposed so as to be selectably in fluid communication with one or both of: a first valve, operable from an open position through a closed position, for respectively promoting and prohibiting fluid flow from the fluid supply, and a second valve, operable from an open position through a closed position, for respectively promoting and prohibiting fluid flow to or from the tire. The method of sensing fluid pressure of a tire and the fluid supply of a tire pressure management system maintaining same includes disposing a sensor so as to be selectably in fluid communication with one or both of: a first valve, operable from an open position through a closed position, for respectively promoting and prohibiting fluid flow through a supply passage from the fluid supply, and a second valve, operable from an open position through a closed position, for respectively promoting and prohibiting fluid flow to or from the tire.

The invention provides improved elements and arrangements thereof, for the purposes described, which are inexpensive, dependable and effective in accomplishing intended purposes of the invention. Other features and advantages of the present invention will become apparent from the following description of the preferred embodiments, which refers to the accompanying drawings.

BRIEF DESCRIPTION OF THE DRAWINGS

The invention is described in detail below with reference to the following figures, throughout which similar reference characters denote corresponding features consistently, wherein.

DETAILED DESCRIPTION OF THE PREFERRED EMBODIMENTS

The invention is an apparatus for and a method of sensing fluid pressure of a tire and the fluid supply of a tire pressure management system maintaining same, with a central sensor and which requires the control of only two valves.

Figure 1:
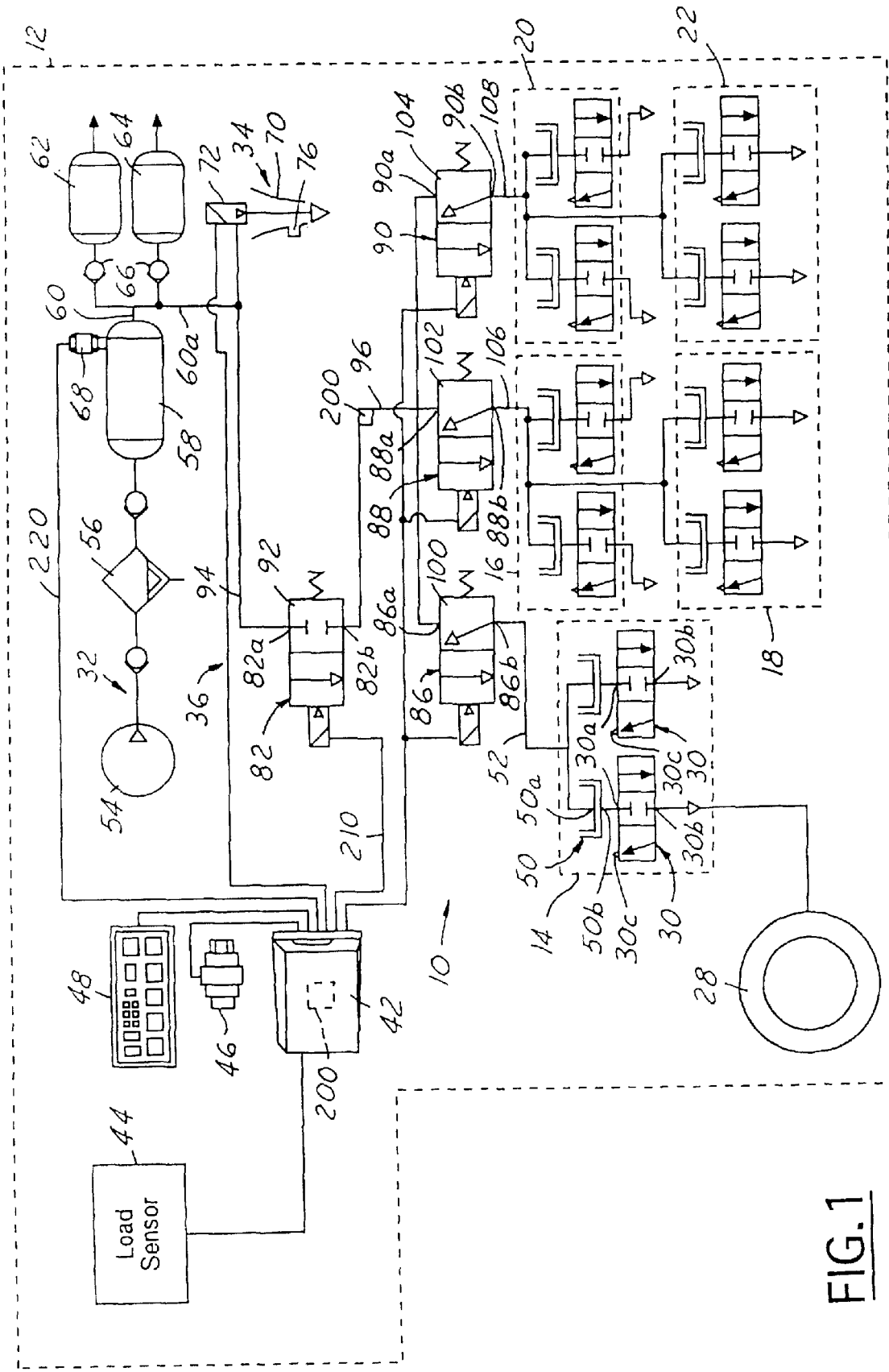
FIG. 1 is a diagrammatic view of a tire pressure management system for a vehicle, a vehicle incorporating same being shown in dotted line.

FIG. 1 shows a tire pressure management system 10 for a vehicle 12 for describing, but not limiting applicability of the invention. Vehicle 12 may be, but is not limited to being a tractor-trailer. The system may be used in connection with a wide variety of vehicles, including automobiles.

Figure 2:
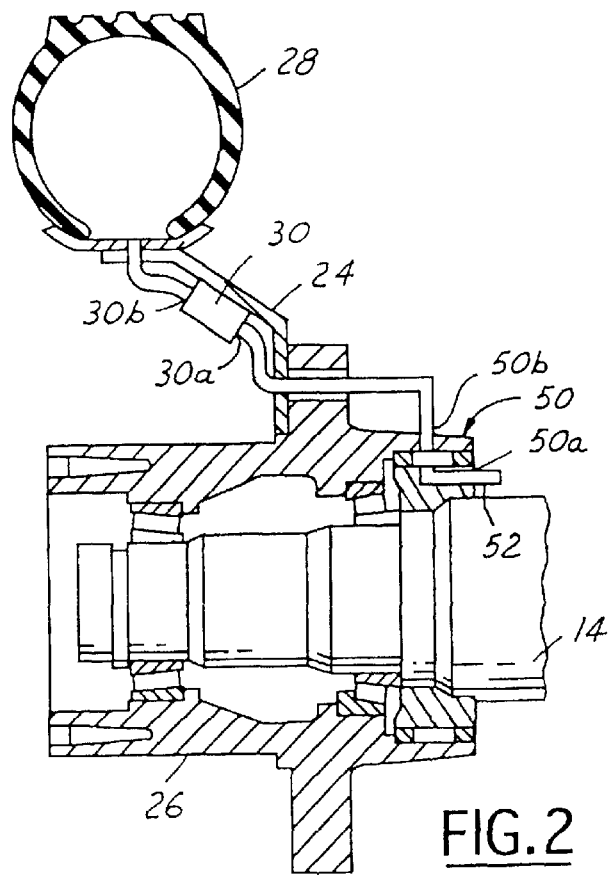
FIG. 2 is a cross-sectional detail view of a conventional vehicle wheel assembly.

Vehicle 12 may include a plurality of axles, including a steer axle 14, a tandem axle assembly having drive axles 16, 18 and another tandem axle assembly having trailer axles 20, 22. As shown in greater detail in FIG. 2, each axle, such as drive axle 14, may include wheels 24 affixed to wheel hubs 26 disposed at each outboard end of the axle and rotationally supported on axle 14. Each wheel 24 may include one or more inflatable tires 28 mounted thereon.

System 10 monitors and controls pressure within each tire 28 of vehicle 12. System 10 may include wheel valve assemblies 30, a fluid source 32, and a fluid control circuit 36. System 10 may further include at least a sensor 200, one or more electronic control units 42, one or more load sensors 44, a speed sensor 46, and an operator control device 48.

Wheel valve assemblies 30 are provided to control the flow of pressurized fluid into and out of tires 28. Valve assembly 30 is mounted to each end of each axle and is connected to the remainder of system 10 through a rotary seal connection 50. Wheel valve assembly 30 is conventional and may include the wheel valve assembly described and illustrated in U.S. Pat. No. 5,253,687 or U.S. Pat. No. 6,250,327, the entire disclosures of which are incorporated herein.

Rotary seal assembly 50 also is conventional and may include the rotary seal assembly described and illustrated in U.S. Pat. No. 5,174,839, the entire disclosure of which also is incorporated herein.

Referring again to FIG. 2, wheel valve assembly 30 may include an inlet port 30a coupled to a rotatable port 50b of rotary seal assembly 50, an outlet port 30b in fluid communication with the interior of tire 28, and an exhaust port 30c, best shown in FIG. 1. Rotary seal assembly 50 may further include a non-rotatable port 50a connected to a conduit 52 of fluid control circuit 36. Valve assembly 30 assumes a closed position, as illustrated in FIG. 1, when the fluid pressure at inlet port 30a is substantially atmospheric, an open position connecting inlet port 30a and outlet port 30b when the fluid pressure at inlet port 30a is a positive pressure, and an exhaust position connecting outlet port 30b and exhaust port 30c when the fluid pressure at inlet port 30a is a negative pressure.

Fluid source 32 provides positive pressurized fluid to system 10 and tires 28. Fluid source 32 is conventional and may include a pressure source, such as a pump 54, an air dryer 56, and a first fluid tank 58 connected via a conduit 60 to the brake system fluid tanks 62, 64 and to the fluid control circuit 36 via a branch conduit 60a. Check valves 66 prevent sudden loss of fluid pressure in-brake tanks 62, 64 in the event of upstream pressure loss.

Fluid control circuit 36 directs the flow of pressurized fluid within system 10 for controlling pressure in tires 28 of vehicle 12. Control circuit 36 may include a pressure control valve 82 and a plurality of axle distribution valves 86, 88, 90. As shown, a single fluid control circuit 36 controls pressure in all of the tires 28 of vehicle 12. However, control circuit 36, and other portions of system 10, may be replicated so that, for example, one control circuit 36 may control tire pressures in the tractor portion of vehicle 12 and another control circuit 36 may control tire pressure in the trailer portion of vehicle 12.

Pressure control valve 82 directs pressurized fluid from fluid source 32 to tires 28 of vehicle 12. Valve 82 may include a conventional two position-two way, solenoid controlled and pilot fluid operated valve. Valve 82 includes a valving member 92 that is spring biased toward a closed position, as shown in FIG. 1. Valving member 92 assumes an open position in response to energizing of a solenoid operatively associated therewith via control signals from electronic control unit 42. Valve 82 has a first port 82a coupled to a conduit 94 leading to fluid source 32. Valve 82 has a second port 82b coupled to another conduit 96 leading to axle distribution valves 86, 88, 90.

Axle distribution valves 86, 88, 90 limit the supply of positive pressurized fluid to, or the release of fluid from, the tires 28 of one or more axles 14, 16, 18, 20, 22 of vehicle 12. Valves 86, 88, 90 are conventional and may include two position-two way, solenoid controlled and pilot fluid operated valves. Valves 86, 88, 90 direct the flow of fluid to and from the tires 28 of axles 14, 16 and 18, and 20 and 22, respectively. Each of valves 86, 88, 90 includes a valving member 100, 102, 104, respectively, that is spring-biased toward a closed position, as shown in FIG. 1, and which assumes an open position in response to energizing a solenoid operatively associated therewith via electrical signals from electronic control unit 42. Each of valves 86, 88, 90 respectively has first ports 86a, 88a, 90a coupled to conduit 96. Each of valves 86, 88, 90 respectively has second ports 86b, 88b, 90b leading to respective corresponding conduits 52, 106, 108 for each axle or tandem axle of vehicle 12. When valves 86, 88, 90 are opened, fluid is permitted to flow toward and into tires 28. When valves 86, 88, 90 are closed, fluid is restricted from tires 28 and vented to the atmosphere.

Although axle distribution valves 86, 88, 90 are shown, individual tire distribution valves could be used in conjunction with axle distribution valves 86, 88, 90 or as an alternative to axle distribution valves 86, 88, 90 to further control the flow of fluid to and from individual tires 28 of vehicle 12. Further, although only three axle distribution valves 86, 88, 90 are shown, the number of axle distribution valves may be varied depending upon the number of axles of vehicle 12 and to allow for greater individual control of the tires 28 of vehicle 12.

Figure 4:
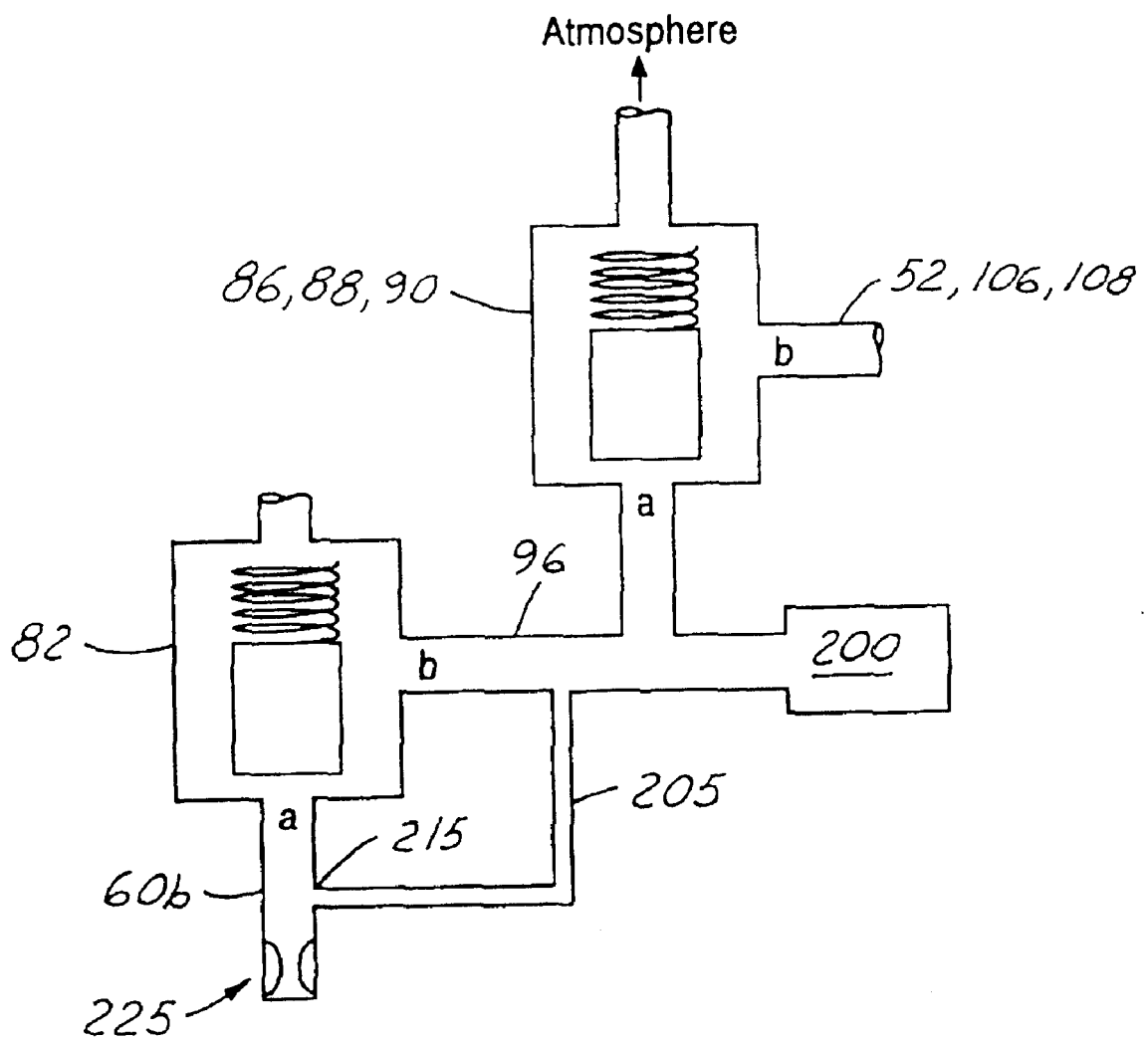
FIG. 4 is a schematic view of a portion o a tire pressure management system configured according to the invention.

Referring to FIGS. 1 and 4, sensor 200 may be electrically integrated with electronic control unit 42. Sensor 200 is disposed in fluid communication with conduit assemblies for conducting fluid from fluid source 32 and to and/or from tires 28. Specifically, sensor 200 is disposed in conduit 96 between valve 82 and valves 86, 88 and 90. When valve 82 is open and any of valves 86, 88, and 90 are open, fluid flows from fluid source 32 to tires 28, and sensor 200 may measure a dynamic pressure associated therewith. When valve 82 is open and valves 86, 88 and 90 are closed, assuming equilibrium conditions exist, sensor 200 may sense a pressure of fluid available in fluid source 32. When valve 82 is closed and one of valves 86, 88 and 90 is open, assuming equilibrium conditions exist, sensor 200 may sense a pressure of fluid in a tire 28 associated with the open one of valves 86, 88 and 90. Thus, one sensor 200 is able to measure the fluid pressure of fluid source 32 and tires 28.

Sensor 200 may transmit a parameter signal indicative of a measured parameter associated with the fluid pressure in fluid source 32 and a tire 28 of vehicle 12. The parameter may correspond to fluid pressure or another attribute, such as temperature, that may be indicative of pressure.

The invention also provides for compensating for fluid, hence fluid pressure, losses occasioned through valve or line leaks, such as from valve 82 or conduit 96. Such leaks are commonplace and, if not serious, not worth the expense of repairing same. Once a leak attains a critical stage, when the leak allows a substantial amount of fluid to escape, such may justify economically tearing down the tire pressure maintenance system to repair or replace parts thereof. However, until reaching the critical stage, supplementing the conduit assemblies with compressed fluid is an economically viable alternative.

Accordingly, as shown in FIG. 4, the invention includes a bleed air line 205 connected between and fostering continuous fluid communication between conduit 60a, which conducts fluid from fluid source 32 to valve 82, and conduit 96, which conducts fluid from valve 82 to valves 86, 88, and 90. Bleed air line 205 bypasses, therefore flow therethrough is not influenced by, valve 82. Alternatively, bleed air line 205 may have an end 215 connected, not to conduit 60a as shown, but to any other conduit continuously pressurized by fluid source 32.

As shown in FIG. 4 conduit 60a may have a restriction 225. Preferably, restriction 225 defines a passage that is 0.040 inches in diameter. Restriction 225 restricts flow through conduit 60a to an amount of fluid sufficient to open one valve assembly 30. Restriction 225 prevents unintentional inflation of a tire 28 in fluid communication with a conduit assembly for conducting fluid to a tire 28 selected for inflation. Thus, the restricted fluid flow in conduit 60a would have sufficient pressure to trigger opening the valve assembly 30 for the tire 28 targeted for inflating, but insufficient pressure to trigger opening of other valve assemblies 30.

Figure 3:
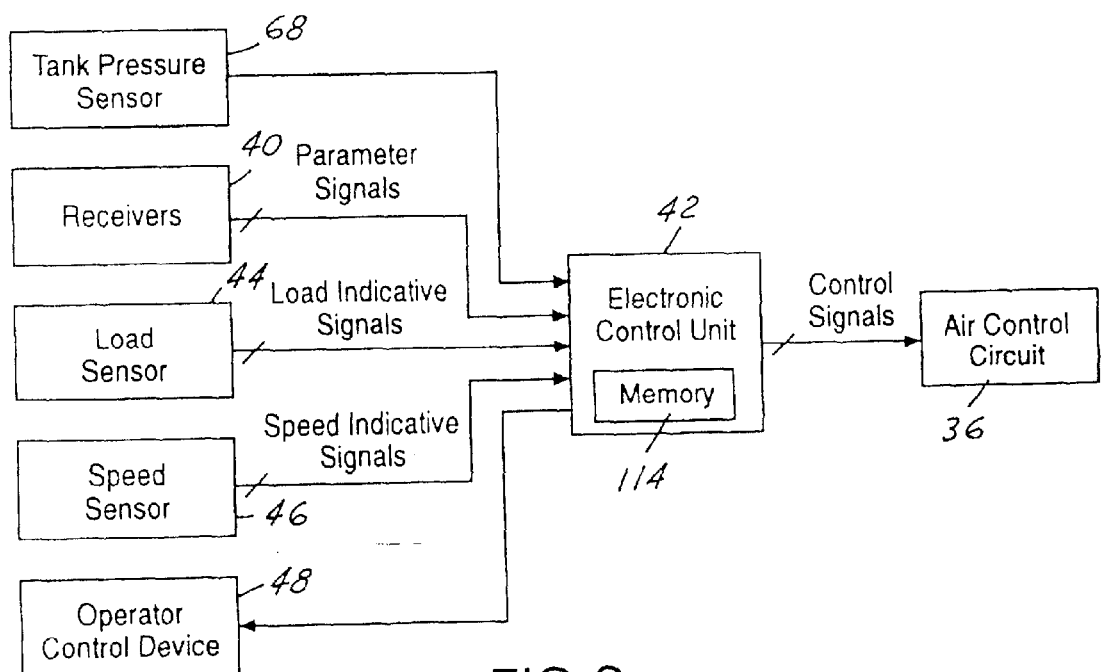
FIG. 3 is a schematic view of components of the system of FIG. 1.

Referring to FIG. 3, electronic control unit 42 controls fluid control circuit 36. Control unit 42 may include a microprocessor operating under the control of a set of programming instructions commonly referred to as software. Electronic control unit 42 may include a memory 114 in which the programming instructions are stored. Memory 114 also may contain identification codes for each tire 28 of vehicle 12 to uniquely identify the particular tire 28 to which a particular parameter signal corresponds. Memory 114 also may be used to record tire pressure values or user inputs over a period of time to assist in evaluating tire pressure management.

Control unit 42 may receive input signals from sensor 200, one or more load sensors 44, speed sensor 46, and operator control device 48. Control unit 42 outputs a plurality of control signals to control valves 82, 86, 88, 90 of fluid control circuit 36. Control unit 42 also may generate a plurality of output signals to a display device which may include a part of operator control device 48 or a freestanding device. The latter signals may be used to trigger the display pressure readings and/or deflection levels for each vehicle tire 28, the load on vehicle 12 or a portion of it, and the speed of vehicle 12. The signals may also be used to trigger warnings to the operator of vehicle 12 in the event that pressure cannot be maintained in one of the vehicle tires 28, the pressure exceeds or falls below predetermined maximum and minimum tire pressure values, or the pressure differs from a target tire pressure value by more than a predetermined amount.

Load sensors 44 provide an indication as to the load on vehicle 12 and, consequently, tires 28 of vehicle 12, or the load on some portion of vehicle 12 and, consequently, select tires 28 of vehicle 12. Load sensors 44 are conventional and load sensing may be provided in a variety of known ways, including through analysis of pneumatic pressure in the suspension of vehicle 12, analysis of powertrain parameters, the use of displacement transducers, or the implementation of load beams and strain gauges. Each load sensor 44 may provide one or more signals to electronic control unit 42 indicative of the load bearing on vehicle 12 or a portion thereof.

Electronic control unit 42 may initiate pressure adjustment in tires 28 of vehicle 12 in response to signals from load sensors 44 in a variety of ways. For example, electronic control unit may cause an increase or decrease in the pressure in one or more tires 28 responsive to a corresponding increase or decrease in vehicle load based on a variety of linear or non-linear functions. One or more tire deflection tables may be stored in a memory, such as memory 114, and accessed by electronic control unit 42 responsive to the signals from load sensors 44.

Speed sensor 46 measures the speed of vehicle 12 to further control deflection levels for tires 28. High deflection levels can create safety concerns and reduce tire life if maintained while vehicle 12 is operating at relatively high speeds. Speed sensor 46 is conventional in the art and provides a signal to electronic control unit 42 corresponding to speed.

Operator control device 48 may allow the operator of vehicle 12 to exert at least some level of control over system 10. Device 48 is conventional in the art and may include a plurality of input/output devices, such as a keypad, touch screen, switches or similar input devices, and a display screen, sound generator, lights or similar output devices. Thus, device 48 permits an operator of vehicle 12 to transmit control signals to electronic control unit 42 to adjust pressure levels within the tires 28 of vehicle 12. The control signals may, for example, correspond to deflection levels for tires 28 of vehicle 12. As a result, the operator is able to adjust the deflection level of the tires 28 to correspond to the terrain over which vehicle 12 is traveling. Such control is desirable to provide improved floatation and traction on certain terrain.

While the invention has been particularly shown and described with reference to the preferred embodiments thereof, it is well understood by those skilled in the art that various changes and modifications can be made in the invention without departing from the spirit and scope of the invention.

We claim:

1. A tire pressure management system for a vehicle, comprising:
    a fluid source;
    a fluid control circuit configured to deliver pressurized fluid from said fluid source to a first tire of said vehicle, said fluid control circuit including:
        a sensor disposed in a first conduit of said fluid control circuit;
        a first valve disposed between said sensor and said fluid source;
        a second valve disposed between said sensor and said first tire;
    wherein said sensor is configured to indicate a supply pressure of said fluid source when said first valve is opened and said second valve is closed and said sensor is configured to indicate a tire pressure in said first tire when said first valve is closed and said second valve is opened.

2. The system of claim 1, wherein said fluid source includes a fluid tank from which said pressurized fluid is drawn.

3. The system of claim 1 wherein said second valve comprises an axle distribution valve.

4. The system of claim 1 wherein said sensor is configured to indicate a dynamic fluid pressure of said pressurized fluid when said first and second valves are opened.

5. The system of claim 1 wherein said fluid control circuit includes a third valve disposed between said sensor and a second tire of said vehicle and said sensor is configured to indicate a tire pressure in said second tire when said first and second valves are closed and said third valve is opened.

6. The system of claim 1 further comprising a bleed line extending between said first conduit and a second conduit disposed between said fluid source and said first valve.

7. The system of claim 1, further comprising a restrictor disposed in a second conduit disposed between said fluid source and said first valve.

8. A tire pressure management system for a vehicle, comprising:
    a fluid source;
    a fluid control circuit configured to deliver pressurized fluid from said fluid source to a first tire of said vehicle, said fluid control circuit including a first conduit;
a sensor disposed in said first conduit;
a second conduit;
a first valve having an inlet port disposed at one end of said second conduit and an outlet port disposed at one end of said first conduit;
a second valve having an inlet port disposed at a second end of said first conduit and an outlet port in fluid communication with a tire of said vehicle; and,
wherein said sensor is configured to indicate a supply pressure of said fluid source when said first valve is opened and said second valve is closed and said sensor is configured to indicate a tire pressure in said first tire when said first valve is closed and said second valve is opened.

9. The system of claim 8, wherein said fluid source includes a fluid tank from which said pressurized fluid is drawn.

10. The system of claim 8 wherein said second valve comprises an axle distribution valve.

11. The system of claim 8 wherein said sensor is configured to indicate a dynamic fluid pressure of said pressurized fluid when said first and second valves are opened.

12. The system of claim 8 wherein said fluid control circuit includes a third valve disposed between said sensor and a second tire of said vehicle and said sensor is configured to indicate a tire pressure in said second tire when said first and second valves are closed and said third valve is opened.

13. The system of claim 8 further comprising a bleed line extending between said first and second conduits.

14. The system of claim 8, further comprising a restrictor disposed in said second conduit.

* * * * *